March 31, 1959   H. H. FINK   2,880,128
CONVEYOR BELT FOR TOBACCO HANDLING
Filed Feb. 25, 1955

INVENTOR.
HERBERT H. FINK
BY
ATTY.

United States Patent Office 2,880,128
Patented Mar. 31, 1959

2,880,128

CONVEYOR BELT FOR TOBACCO HANDLING

Herbert H. Fink, Akron, Ohio, assignor to The B. F. Goodrich Company, New York, N.Y., a corporation of New York Application February 25, 1955, Serial No. 490,635

10 Claims. (Cl. 154—52.1)

This invention relates to conveyor belts particularly suited for handling dried tobacco leaves and the like.

In the manufacture of tobacco products, the stems of the tobacco leaves frequently become broken from the leaves as the leaves are conveyed on traveling belts to certain processing equipment. The broken stems tend to roll about on the surface of the belt beneath the leaves and cause the leaves to slide on the belt and become piled up or broken and crushed against the skirt boards of the belt.

In accordance with this invention a belt is provided having its load-carrying side shaped in a contour which arrests such rolling motion of the broken stems and prevents the tobacco leaves from sliding relative to the belt under the foregoing conditions. The belt is formed with a thin flexible carcass, the load-carrying side of which includes a series of narrow faces upstanding from the carcass and extending transversely across the belt. The faces are spaced apart from each other in the lengthwise direction of the belt and each face is directed in the direction in which the load-carrying side of the belt travels. The portions of the surface of the load-carrying side intermediate these faces is oriented so that each extends from the portion of one face close to the carcass forwardly in the direction of travel of the belt to a ridge formed by the upper edge of the next adjoining forward face. The faces act as abutments against which the stems collect when they are broken thereby preventing the stems from rolling freely on the belt surface.

The invention will be further described with reference to the accompanying drawing in which the structure of a preferred conveyor belt embodying this invention is illustrated. In the drawings.

Figure 1:
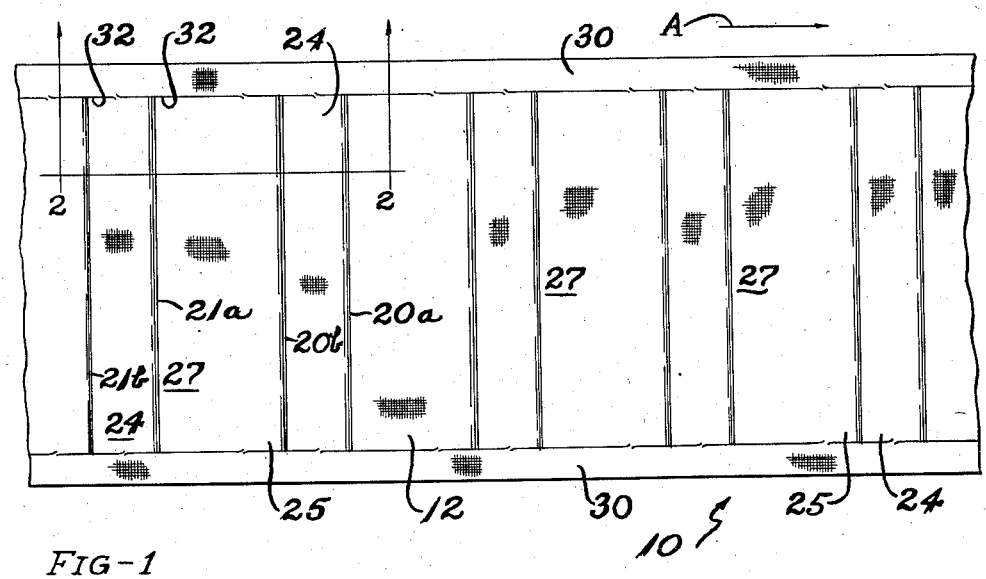
Fig. 1 is a plan view of the load-carrying side of a belt made in accordance with this invention.
Figure 2:
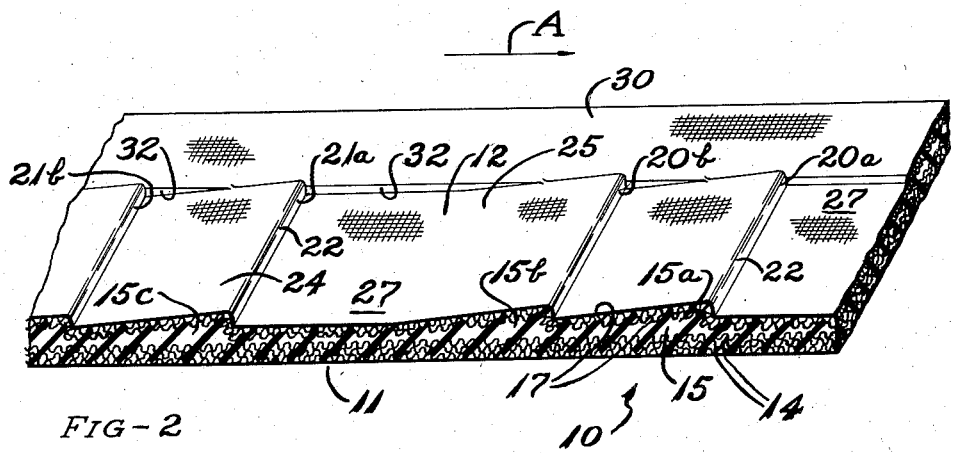
Fig. 2 is a view showing the cross-sectional shape of the belt in a lengthwise direction (see line 2—2 of Fig. 1) together with a portion of the load-carrying side of the belt drawn in oblique projection.

The belt 10 is designed to travel about its supporting pulleys (not shown) in the direction of the arrow A indicated in Figs. 1 and 2, and has a generally plane pulley-contacting side 11 and a contoured load-carrying side 12. The belt structure includes a thin flexible carcass 14 formed of a lamination of several plies of rubber-impregnated duck fabric of the conventional type used in light-weight belt construction. Overlying the carcass plies is a layer of a resilient rubber-like material 15 which in a finished belt provides a cushion above the carcass 14 along the load-carrying side and which during the vulcanization flows to permit the upper fabric plies to assume the contoured shape provided by the mold. The cushion 15 is covered completely by two or more sheets of fabric 17 (note Fig. 3). The outermost sheet of fabric 17 is spread on both sides with a suitable rubber cement, whereas the sheet of fabric 17 intermediate the outermost sheet may be friction-coated with rubber. The friction-coated sheet adheres to the rubber cushion during the vulcanization process. The outermost sheet is only spread-coated to prevent rubber strike-through to the outer surface during vulcanization which rubber strike-through would ultimately tend to flake off from the surface of the belt and contaminate the tobacco leaves.

Figure 3:
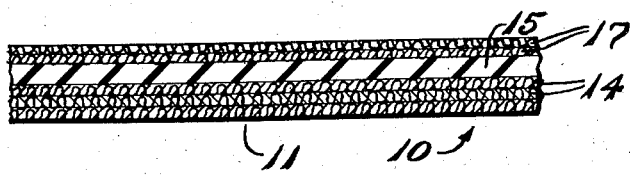
Fig. 3 is a fragmentary view drawn on an enlarged scale showing a longitudinal section of the belt before it is vulcanized.

Normally, in making the belt, the rubber cushion 15 is of uniform thickness as shown in Fig. 3 when it is assembled with the plies 14. The belt materials are thereafter vulcanized in molds which exert sufficient pressure on the belt materials to cause the rubber cushion 15 to flow into a series of transverse portions 15a, 15b, 15c, etc. which are generally wedge-shaped in cross-section longitudinally of the belt to provide the contour for the load-carrying side as shown in Fig. 2.

The contour of the load-carrying side 12, after vulcanization, is shaped into a series of narrow faces such as are indicated by numerals 20a, 20b, 21a and 21b in Figs. 1 and 2. These faces are upstanding from the carcass portion 14 and they extend transversely across the belt parallel each other to serve as abutments to arrest the rolling motion of a broken stem. Preferably the upstanding width of these faces is slightly less than the thickness of the carcass portion 14 below the rubber cushion 15. Each of the faces is directed forwardly in the direction in which the belt travels and terminates along its upper edge in a ridge portion 22. The surfaces 24 and 25 of the load-carrying side intermediate the faces 20 and the faces 21, respectively slope rearwardly and downwardly from each ridge 22 to the lower edge of the next succeeding rearward face.

The stems usually range in length from about one inch to about two inches with the majority of them being either about one inch or about two inches in length. Hence the upstanding faces 20a, 20b, etc. are grouped in pairs and the distance lengthwise of the belt between the faces of each pair is about one inch and the distance lengthwise of the belt from one pair to the next pair is about two inches. That is to say, in Fig. 2, faces 20a and 20b are preferably spaced approximately one inch apart, which spacing is approximately half the distance between faces 20b and 21a. Thus if a long stem should become bridged across the ridges 22 of the closely spaced faces such as 20a—20b, this stem will roll or is otherwise vibrated until it comes into engagement with the leading face of the next succeeding pair of faces, such a the face 21a.

Each of the wide surfaces 25 has a rearward portion 27 which is generally plane and parallel to the carcass plies 14. The forward portion of these surfaces slopes upwardly from the carcass at about the same angle as the slope of the narrower surfaces 24. The sloping portion of the surfaces 25 and the surfaces 24 are preferably plane.

Along each margin of the load-carrying side there is a plane marginal surface 30 which is relatively narrow compared to the overall width of the belt. These marginal surfaces usually are positioned below the edges of skirt boards (not shown) which keep the leaves from falling from the sides of the belt. The upstanding faces 20, 21 and surfaces 24 and 25 terminate against these areas as shown in Fig. 2. It may be noted that each of the several faces 20 and 21 projects above the plane of the areas 30 and the surfaces 24 and 25 adjoin the lower portion of their respective faces below the plane of these areas. The resulting corners 32 thereby formed prevent the stems from rolling laterally off the side of the belt under the skirt boards. The size of each leaf is such that each will extend over several pairs of faces and the leaves are sufficiently flexible so that a substantial area of the leaves will be in contact with the sloping surfaces 24 and 25. Also the edges of the leaves may be engaged by some of the upstanding faces to further safeguard against slippage of the leaves on the belt.

Variations in the structure may be made within the scope of the appended claims.

I claim

1. A conveyor belt comprising a thin flat flexible carcass portion having a contoured load-carrying side thereon, the load-carrying side consisting of a first series of generally plane surfaces extending transversely to the carcass and spaced apart lengthwise of the belt, and a second series of generally plane surfaces each extending transversely to the carcass alternately with said first series, the surfaces of said first series having double the lengthwise extent of the surfaces of said second series in a direction lengthwise of the belt, and each of said surfaces of said first series having a portion closely adjacent said carcass and another portion slanting gradually upwardly therefrom in the direction of travel of the load-carrying reach and terminating at a ridge transverse to the carcass and spaced appreciably from the carcass and then being directed abruptly downward toward the carcass to merge with the next adjacent surface of said second series, the latter said surface slanting gradually upwardly from said carcass in the direction of travel of the belt and terminating at a ridge transverse to the belt and parallel to said ridge of said first surface and then being directed abruptly downwardly to merge with the next adjacent first surface, the pattern continuing in this form throughout the length of the belt.

2. A conveyor belt in accordance with claim 1 in which each said surfaces of said first and said second series terminates adjacent the longitudinal margins of the belt at a comparatively narrow plane marginal surface which extends lengthwise along each margin of the belt parallel to said carcass.

3. A conveyor belt comprising a plurality of rubber impregnated layers of fabric having a conveying surface formed of a plurality of slightly inclined sections occurring in longitudinal succession, and wedge-shaped transversely extending bodies of rubber embedded between two adjacent layers of said fabric and supporting said inclined sections.

4. A conveyor belt comprising a plurality of layers of fabric secured together by a rubber composition, a first group of said layers being in flat face to face relation, a second group of said layers being of saw-tooth shape in longitudinal section, and a plurality of rubber bodies of corresponding saw-tooth shape in cross section positioned between said first and second groups in the spaces provided by the saw teeth formed by said second group of layers.

5. A conveyor belt comprising a plurality of layers of fabric impregnated with and bonded together by a rubber composition, said belt having a conveying surface comprising a plurality of inclined transverse sections occurring in longitudinal succession, and a plurality of transversely extending vulcanized rubber bodies of wedge-shaped cross section embedded between predetermined adjacent layers of said fabric effective to support said inclined sections, one of said adjacent layers being substantially flat throughout its length and breadth, the other of said adjacent layers conforming in contour to said conveying surface.

6. A conveyor belt comprising a plurality of layers of fabric impregnated with and bonded together by a rubber composition, said belt having a conveying surface comprising a plurality of inclined transverse sections occurring in longitudinal succession, and a plurality of transversely extending vulcanized rubber bodies of wedge-shaped cross section embedded between predetermined adjacent layers of said fabric effective to support said inclined sections, one of said adjacent layers being substantially flat throughout its length and breadth, the other of said adjacent layers conforming in contour to said conveying surface, said inclined sections occurring in pairs, successive pairs being spaced from each other by a flat section of predetermined length.

7. A conveyor belt comprising a thin generally flat flexible carcass portion of rubber-treated fabric, and a cushion layer of rubber material on one side thereof having a contoured fabric-covered load-carrying side thereon, the contour of the load-carrying side comprising a series of generally plane surfaces extending transversely to the carcass and uninterrupted in their transverse extent and disposed in longitudinal succession, and each said surface sloping gradually upwardly from the carcass to a peak and then extending sharply downwardly from said peak to a position close to the carcass portion of the belt where said surface merges with the next adjacent surface.

8. A conveyor belt comprising a thin generally flat flexible carcass portion of rubber-treated fabric, and a cushion layer of rubber material on one side thereof having a contoured fabric-covered load-carrying side thereon, the contour of said side comprising a series of discrete surfaces each of uniform width transverse to the carcass and occurring in longitudinal succession and being uninterrupted in their transverse extent, and each of said surfaces including regions sloping gradually upwardly from the carcass in the direction of travel of the belt to a peak and then extending abruptly downwardly from said peak to the portion of the next adjacent surface close to the carcass of the belt, and the extent of alternate surfaces lengthwise of the carcass being appreciably greater than the lengthwise extent of the intervening surfaces.

9. A conveyor belt comprising a thin generally flat flexible carcass composed of rubber-impregnated fabric, a cushion of rubber material overlying said carcass, the cushion comprising a series of rubber portions each generally wedge-shaped in cross-section and extending transversely of the belt, and each of said portions being thin along one side thereof transverse to the carcass and tapering progressively in the direction lengthwise of the belt to an appreciably greater thickness adjacent the opposite side of the portion, and said successive rubber portions of said cushion having their respective thin sides immediately adjacent the thick sides of the adjoining portion, and a cover of flexible fabric supported by said wedge shaped cushion portions and conforming to the contour thereof to form the load-carrying surface of the belt, the resulting surface contour of said fabric being characterized by a series of transverse load-carrying areas occurring in longitudinal succession and tapering gradually away from said carcass and being uninterrupted in their transverse extent.

10. A conveyor belt comprising a thin generally flat flexible carcass of rubber-impregnated fabric, a cushion of rubber material overlying said carcass, the cushion having a generally saw-toothed surface contour in a direction longitudinally of the belt, and a cover of flexible fabric supported on and overlying said cushion and adhered to and conforming to said contour of said cushion, the resulting configuration of said cover being characterized by a series of transverse load-carrying surface portions occurring in longitudinal succession and tapering gradually away from said carcass and being uninterrupted in their transverse extent, and said cover fabric being adapted to preclude strike-through of said rubber-cushion material to the outer surface of said cover fabric.

References Cited in the file of this patent

UNITED STATES PATENTS

| Number | Name | Date |
| --- | --- | --- |
| 626,461 | Gates | June 6, 1899 |
| 1,948,332 | Carter | Feb. 20, 1934 |
| 2,221,984 | McKay | Nov. 19, 1940 |
| 2,303,762 | Reimel et al. | Dec. 1, 1942 |
| 2,514,429 | Waugh | July 11, 1950 |